US008074278B2

(12) United States Patent
Law et al.

(10) Patent No.: US 8,074,278 B2
(45) Date of Patent: Dec. 6, 2011

(54) APPARATUS AND METHODS FOR INTRUSION PROTECTION IN SAFETY INSTRUMENTED PROCESS CONTROL SYSTEMS

(75) Inventors: Gary Law, Georgetown, TX (US); Godfrey R. Sherriff, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 786 days.

(21) Appl. No.: 11/855,312

(22) Filed: Sep. 14, 2007

(65) Prior Publication Data

US 2009/0077662 A1    Mar. 19, 2009

(51) Int. Cl.
G06F 11/00 (2006.01)
G06F 12/14 (2006.01)
G06F 12/16 (2006.01)
G08B 23/00 (2006.01)
G05B 9/02 (2006.01)

(52) U.S. Cl. ............................ 726/23; 726/25; 713/188
(58) Field of Classification Search ...................... 726/23
See application file for complete search history.

(56) References Cited

U.S. PATENT DOCUMENTS

| | | | | | |
|---|---|---|---|---|---|
| 5,870,543 | A * | 2/1999 | Ronning | | 726/33 |
| 5,887,131 | A * | 3/1999 | Angelo | | 726/20 |
| 6,785,821 | B1 * | 8/2004 | Teal | | 726/23 |
| 6,975,966 | B2 * | 12/2005 | Scott et al. | | 702/183 |
| 7,007,301 | B2 * | 2/2006 | Crosbie et al. | | 726/23 |
| 7,076,312 | B2 * | 7/2006 | Law et al. | | 700/23 |
| 7,085,928 | B1 * | 8/2006 | Schmid et al. | | 713/164 |
| 7,134,141 | B2 * | 11/2006 | Crosbie et al. | | 726/23 |
| 7,246,156 | B2 * | 7/2007 | Ginter et al. | | 709/217 |
| 7,590,848 | B2 * | 9/2009 | Powers | | 713/176 |
| 7,676,841 | B2 * | 3/2010 | Sobchuk et al. | | 726/23 |
| 2003/0084330 | A1 | 5/2003 | Tarquini et al. | | |
| 2003/0149887 | A1 | 8/2003 | Yadav | | |
| 2004/0093582 | A1 * | 5/2004 | Segura | | 717/102 |
| 2004/0107345 | A1 * | 6/2004 | Brandt et al. | | 713/171 |
| 2004/0153171 | A1 * | 8/2004 | Brandt et al. | | 700/9 |
| 2004/0268322 | A1 * | 12/2004 | Chow et al. | | 717/136 |
| 2005/0015624 | A1 | 1/2005 | Ginter et al. | | |
| 2005/0044405 | A1 * | 2/2005 | Spraggs | | 713/200 |

(Continued)

FOREIGN PATENT DOCUMENTS

EP    1414215    4/2004

OTHER PUBLICATIONS

Great Britain Intellectual Property Office, "Patents Act 1977: Search Report under Section 17(5)," issued in connection with Great Britain Patent Application No. GB0816747.0, mailed Jan. 9, 2009, 3 pages.

(Continued)

*Primary Examiner* — Nathan Flynn
*Assistant Examiner* — Carolyn B Kosowski
(74) *Attorney, Agent, or Firm* — Hanley, Flight & Zimmerman, LLC.

(57) ABSTRACT

Apparatus and methods for intrusion protection in safety instrumented process control systems are disclosed. An example method of protecting a safety instrumented system includes receiving legitimate information from a component of a process control system wherein the legitimate information is intended for delivery to a safety instrumented system, determining if a signature at least substantially matches the legitimate information, and preventing the legitimate information from reaching the safety instrumented system when it is determined that the signature at least substantially matches the legitimate information.

14 Claims, 5 Drawing Sheets

U.S. PATENT DOCUMENTS

| | | |
|---|---|---|
| 2005/0141119 A1 | 6/2005 | Takeuchi et al. |
| 2006/0026683 A1* | 2/2006 | Lim ............................... 726/23 |
| 2006/0053491 A1 | 3/2006 | Khuti et al. |
| 2006/0111794 A1* | 5/2006 | Wysuph et al. ................. 700/19 |
| 2007/0056038 A1 | 3/2007 | Lok |
| 2007/0058551 A1* | 3/2007 | Brusotti et al. ............... 370/241 |
| 2007/0199047 A1* | 8/2007 | Gibart et al. ....................... 726/2 |
| 2009/0043415 A1* | 2/2009 | Sun et al. ...................... 700/117 |
| 2009/0282067 A1* | 11/2009 | Bendigeri et al. ............ 707/101 |

OTHER PUBLICATIONS

European Patent Office, European Search Report, issued in EP Application No. 08164138, 2 pages, completed Sep. 30, 2009.

European Patent Office, Written Opinion of the European Search Report, issued in EP Application No. 08164138, 5 pages, completed Sep. 30, 2009.

European Patent Office, Office Action Issued for EP Application No. 08164138.3-2206, Dated Aug. 11, 2010, 6 Pages.

* cited by examiner

APPARATUS AND METHODS FOR INTRUSION PROTECTION IN SAFETY INSTRUMENTED PROCESS CONTROL SYSTEMS

FIELD OF THE DISCLOSURE

The present invention relates generally to process control systems and, more specifically, to apparatus and methods for intrusion protection in safety instrumented process control systems.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, valves, valve positioners, switches and transmitters (e.g., temperature sensors, pressure sensors and flow rate sensors), perform functions within the process such as opening or closing valves and measuring process parameters. The process controller receives signals indicative of process measurements made by the field devices and/or other information pertaining to the field devices, uses this information to implement a control routine and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more software applications that perform campaign management functions, maintenance management functions, virtual control functions, diagnostic functions, real-time monitoring functions, safety-related functions, configuration functions, etc. within the process control system.

Some process control systems or portions thereof may present significant safety risks. For example, chemical processing plants, power plants, etc. may implement critical processes that, if not properly controlled and/or shut down rapidly using a predetermined shut down sequence, could result in significant damage to people, the environment, and/or equipment. To address the safety risks associated with process control systems having such critical processes, many process control system providers offer products compliant with safety-related standards such as, for example, the International Electrotechnical Commission (IEC) 61508 standard and the IEC 61511 standard.

In general, process control systems that are compliant with one or more known safety-related standards are implemented using a safety instrumented system architecture. In such a system architecture, the controllers and field devices associated with the basic process control system, which is responsible for the continuous control of the overall process, are physically and logically separate from special purpose field devices and other special purpose control elements associated with the safety instrumented system, which is responsible for the performance of safety instrumented functions to ensure the safe shutdown of the process in response to control conditions that present a significant safety risk. In particular, compliance with many known safety-related standards requires a basic process control system to be supplemented with special purpose control elements such as logic solvers, safety certified field devices (e.g., sensors, final control elements such as, for example, pneumatically actuated valves), data redundancy devices and routines (e.g., redundancy links, cyclical redundancy checks, etc.), and safety certified software or code (e.g., certified applications, function modules, function blocks, etc.). In addition, many known process control systems also provide at least one graphical run-time interface that allows a user or other system operator to monitor processes, change parameter values, issue commands, etc. to one or more devices, control loops, and/or other process control entities.

Safety instrumented systems are periodically updated to download updated software, updated operation parameters, updated control processes, etc. Current safety instrumented systems use usernames and passwords and/or mechanical key switches to prevent unauthorized download access to safety instrumented systems from workstations in a process control system. However, unauthorized access to a safety instrumented system may be gained if keys are not carefully guarded, users leave logged-in workstations unattended, mechanical locks are not re-armed after use, keys are duplicated, etc.

SUMMARY

Example methods and apparatus for intrusion protection in safety instrumented process control systems are disclosed. An example method of protecting a safety instrumented system involves receiving legitimate information from a component of a process control system wherein the legitimate information is intended for delivery to a safety instrumented system and determining if a signature at least substantially matches the legitimate information. The legitimate information is prevented from reaching the safety instrumented system when it is determined that the signature at least substantially matches the legitimate information.

In accordance with another example, an example apparatus to protect a safety instrumented system is disclosed. The example apparatus includes a receiver to receive legitimate information from a process control portion of a process control system addressed to a safety instrumented system. The apparatus also includes a data store to store at least one signature and a signature analyzer to determine if the at least one signature at least substantially matches the legitimate information and to prevent the legitimate information from reaching the safety instrumented system when the signature at least substantially matches the legitimate information.

In accordance with another example, an example machine readable medium is disclosed. The example machine readable medium includes instructions stored thereon that, when executed, cause a machine to receive legitimate information from a process control portion of a process control system addressed to a safety instrumented system and determine if a signature substantially matches the legitimate information. The machine readable instructions, when executed, further cause the machine to prevent the legitimate information from reaching the safety instrumented system when it is determined that the signature at least substantially matches the legitimate information.

DETAILED DESCRIPTION

In general, the example apparatus and methods described herein may be used in connection with a control system to provide intrusion protection for a safety system (e.g., a safety instrumented system (SIS)) of the control system. More specifically, the example apparatus and methods described herein prevent predetermined instructions sent by a process control system from controlling a safety system. In an example implementation, a legitimate (e.g., valid, authorized, permitted, etc.) instruction sent by a process control system that matches a predefined signature is prevented from reaching a safety system.

As described in greater detail below, an example intrusion protection system (IPS) is provided between a process control system and a safety system (i.e., an SIS) associated with the process control system. The example IPS receives information communicated by the process control system to the safety system. The example IPS compares the received communications to a signature to determine if the received information matches the signature. A match indicates that the received information is a software download unlock command, which is a legitimate instruction for the safety system. If the received information matches the signature, the example IPS discards the information or otherwise prevent the information from reaching the safety system (i.e., does not send the information to the safety system). If the received information does not match the signature, the example IPS routes and/or sends the information to the safety system. The example IPS is also configured to receive information from the safety system that is directed or intended for delivery to the process control system. The example IPS does not monitor such information sent from the safety system to the process control system.

Figure 1:
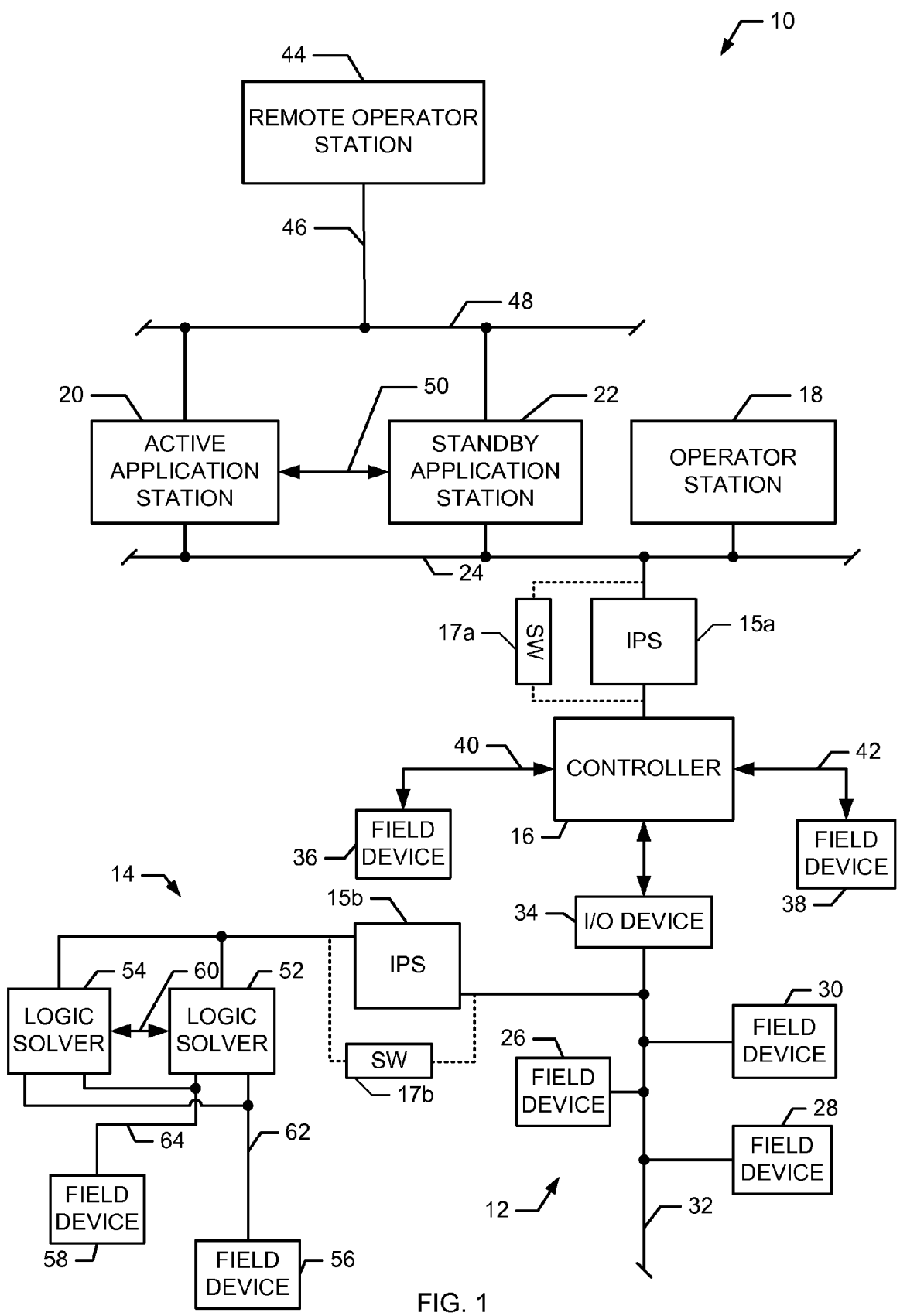
FIG. 1 is a block diagram of an example process control system that may be configured to use the example intrusion protection system apparatus and methods described herein.

FIG. 1 is a block diagram of an example process control system 10 that includes the example intrusion protection apparatus and methods described herein. As shown in FIG. 1, the process control system 10 includes an intrusion protection system (IPS) 15a. The process control system 10 also includes a process control portion 12 communicatively coupled to a safety instrumented system portion 14 (e.g., an SIS) via an intrusion protection system (IPS) 15b and/or via a switch 17. In the illustrated example, process control portion 12 is configured to implement a controlled process and the safety instrumented system portion 14 is configured to implement a shutdown of the controlled process in response to one or more unsafe conditions. The IPS 15a is configured to monitor information communicated from the operator station 18, the active application station 20, the standby application station 22, or the remote operator station 44 to the process control portion 12 or the safety instrumented system portion 14 and to block information that has been selected in advance (i.e., predetermined) and identified using an identifier (e.g., a signature, a code, etc.). The IPS 15b of the illustrated example is configured to monitor information communicated from the process control portion 12 to the safety instrumented system portion 14 and to block information that has been selected in advance (i.e., predetermined) and identified using an identifier (e.g., a signature, a code, etc.). While FIG. 1 includes both the IPS 15a and the IPS 15b, implementations of the process control system 10 may include one or both of the IPS 15a and the IPS 15b. Additionally, the IPS 15a and/or the IPS 15b may be located at any desired location within the process control system 10.

In the illustrated example of FIG. 1, the basic process control portion 12 includes a controller 16, an operator station 18, an active application station 20 and a standby application station 22, all of which may be communicatively coupled via a bus or local area network (LAN) 24, which is commonly referred to as an application control network (ACN). The operator station 18 and the application stations 20 and 22 may be implemented using one or more workstations or any other suitable computer systems or processing units. For example, the application stations 20 and 22 could be implemented using single processor personal computers similar to the example processor system 500 shown in FIG. 5 below, single or multi-processor workstations, etc. In addition, the LAN 24 may be implemented using any desired communication medium and protocol. For example, the LAN 24 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the application stations 20 and 22 may be used to provide redundant communication paths between the operator station 18, the application stations 20 and 22, and the controller 16.

The controller 16 may be coupled to a plurality of smart field devices 26, 28 and 30 via a digital data bus 32 and an input/output (I/O) device 34. The smart field devices 26, 27, 28, 29, and 30 may be Fieldbus compliant valves, actuators, sensors, etc., in which case the smart field devices 26, 27, 28, 29, and 30 communicate via the digital data bus 32 using the well-known Fieldbus protocol. Of course, other types of smart field devices and communication protocols could be used instead. For example, the smart field devices 26, 27, 28, 29, and 30 could instead be Profibus or HART compliant devices that communicate via the data bus 32 using the well-known Profibus and HART communication protocols. Additional I/O devices (similar or identical to the I/O device 34) may be coupled to the controller 16 to enable additional groups of smart field devices, which may be Fieldbus devices, HART devices, etc., to communicate with the controller 16.

In addition to the smart field devices 26, 27, 28, 29, and 30, one or more non-smart field devices 36 and 38 may be communicatively coupled to the controller 16. The non-smart field devices 36 and 38 may be, for example, conventional 4-20 milliamp (mA) or 0-10 volts direct current (VDC) devices that communicate with the controller 16 via respective hardwired links 40 and 42.

The controller 16 may be, for example, a DeltaV™ controller sold by Fisher-Rosemount Systems, Inc. However, any other controller could be used instead. Further, while only one controller is shown in FIG. 1, additional controllers of any desired type or combination of types could be coupled to the LAN 24. The controller 16 may perform one or more process control routines associated with the process control system 10. Such process control routines may be generated by a system engineer or other system operator using the operator station 18 and downloaded to and instantiated in the controller 16.

As depicted in FIG. 1, the example process control system 10 may also include a remote operator station 44 that is communicatively coupled via a communication link 46 and a LAN 48 to the application stations 20 and 22. The remote operator station 44 may be geographically remotely located, in which case the communication link 46 is preferably, but not necessarily, a wireless communication link, an internet-based or other switched packet-based communication network, telephone lines (e.g., digital subscriber lines), or any combination thereof.

As depicted in the example of FIG. 1, the active application station 20 and the standby application station 22 are communicatively coupled via the LAN 24 and via a redundancy link 50. The redundancy link 50 may be a separate, dedicated (i.e., not shared) communication link between the active application station 20 and the standby application station 22. The redundancy link 50 may be implemented using, for example, a dedicated Ethernet link (e.g., dedicated Ethernet cards in each of the application stations 20 and 22 that are coupled to each other). However, in other examples, the redundancy link 50 could be implemented using the LAN 24 or a redundant LAN (not shown), neither of which is necessarily dedicated, that is communicatively coupled to the application stations 20 and 22.

Generally speaking, the application stations 20 and 22 continuously, by exception or periodically, exchange information (e.g., in response to parameter value changes, application station configuration changes, etc.) via the redundancy link 50 to establish and maintain a redundancy context. The redundancy context enables a seamless or bumpless handoff or switchover of control between the active application station 20 and the standby application station 22 in response to a failure of one of the stations 20 and 22. For example, the redundancy context enables a control handoff or switchover from the active application station 20 to the standby application station 22 to be made in response to a hardware or software failure within the active application station 20 or in response to a directive from a system operator or user or a client application of the process control system 10.

As depicted in FIG. 1, the safety instrumented system portion 14 of the process control system 10, includes logic solvers 52 and 54 and field devices 56 and 58. The logic solvers 52 and 54 may be implemented using, for example, the commercially available DeltaV SLS 1508 logic solver produced by Fisher-Rosemount Systems, Inc. In general, the logic solvers 52 and 54 cooperate as a redundant pair via a redundancy link 60. That is, the logic solvers 52 and 54 and the redundancy link 60 implement redundancy techniques substantially similar or identical to those described above in connection with the application stations 20 and 22 and the redundancy link 50. In other example implementations, the redundant logic solvers 52 and 54 could instead be implemented using a single non-redundant logic solver or multiple non-redundant logic solvers.

In the illustrated example, the example logic solvers 52 and 54 are implemented using safety-rated electronic controllers that are configured to implement one or more safety instrumented functions. As is known, a safety instrumented function is configured to monitor one or more process conditions associated with one or more specific hazard and/or unsafe conditions, evaluate the process conditions to determine if a shut down of the process is warranted, and cause one or more field devices, components, and/or elements (e.g., shut down valves) to effect or perform a shutdown of the process, if warranted.

Typically, each safety instrumented function is implemented using at least one sensing device, one logic solver, and one field device, component, or element (e.g., a valve). The logic solver is typically configured to monitor at least one process control parameter via the sensor and, if a hazardous condition is detected, to operate the field device, component, or element to effect a safe shut down of the process. For example, a logic solver may be communicatively coupled to a pressure sensor that senses the pressure in a vessel or tank and may be configured to cause a vent valve to open if an unsafe overpressure condition is detected via the pressure sensor. Of course, each logic solver within a safety instrumented system may be configured to implement one or multiple safety instrumented functions and, thus, may be communicatively coupled to multiple sensors and/or field device, component, or element, all of which are typically safety rated or certified.

The field devices 56 and 58 may be smart or non-smart field devices including sensors, actuators, and/or any other process control devices that can be used to monitor process conditions and/or effect a controlled shut down of the process control system 10. For example, the field devices 56 and 58 may be safety certified or rated flow sensors, temperature sensors, pressure sensors, shut down valves, venting valves, isolation valves, critical on/off valves, etc. While only two logic solvers 52 and 54 and two field devices 56 and 58 are depicted in the safety instrumented system portion 14 of the example process control system 10 of FIG. 1, additional field devices and/or logic solvers may be used to implement any desired number of safety instrumented functions.

As depicted in FIG. 1, the field devices 56 and 58 are communicatively coupled to the logic solvers 52 and 54 via respective links 62 and 64. In the case where the field devices 56 and 58 are smart devices, the logic solvers 52 and 54 may communicate with the field devices 56 and 58 using a hardwired digital communication protocol (e.g., HART, Fieldbus, etc.) However, any other desired communication media (e.g., hardwired, wireless, etc.) and protocol may be used instead. As is also shown in FIG. 1, the logic solvers 52 and 54 are communicatively coupled to the controller 16 via the IPS 15b and/or the switch 17 and the bus 32 and the I/O device 34. However, the logic solvers 52 and 54 could alternatively be communicatively coupled within the system 10 in any other desired manner. For example, the logic solvers 52 and 54 could be coupled directly to the controller 16 via the IPS 15b and/or the switch 17 and/or via the IPS 15b and/or the switch 17 and the LAN 24. Regardless of the manner in which the logic solvers 52 and 54 are coupled within the system 10, the logic solvers 52 and 54 are preferably, although not necessarily, logical peers with respect to the controller 16.

In an example implementation of the system 10, the components of the safety instrumented system portion 14 (e.g., the logic solver 54 and/or the logic solver 52) include a locked state and an unlocked state. In the unlocked state, the unlocked component(s) of the safety instrumented system portion 14 are receptive to communications that include updated instructions and/or parameters for the component(s). For example, the operator station 18 may send a download request for updated operating parameters for the process control portion 12 to the logic solver 54. If the logic solver 54 is in a locked state, the download request will be ignored by the logic solver 54. The state of the components of the safety instrumented system portion 14 is controlled by lock and unlock commands received by the safety instrumented system components from other components (e.g., components of the safety instrumented system portion, components of the process control portion, operator workstations, etc.). Additionally or alternatively, devices implemented according to the Fieldbus Foundation® system may include a locking block that may receive unlock and lock commands.

The IPS 15a of the illustrated example monitors information communicated between the operator stations (operator station 18, the active application station 20, the standby application station 22, and the remote operator station 44) and process control portion 12 and the safety instrumented system portion 14. The IPS 15b of the illustrated example monitors information communicated between the process control portion 12 and the safety instrumented system portion 14. As will be described in further detail in conjunction with FIG. 2, the IPS 15a and/or the IPS 15b receive information (e.g., messages, packets, instructions, signals, etc.) that is directed (e.g., addressed, sent, forwarded, routed, etc.) to the safety instrumented system portion 14. The IPS 15a and/or the IPS 15b compare the information to reference signature(s) representative or indicative of information that has been pre-identified or pre-selected to be blocked by the IPS 15a and/or the IPS 15b to prevent unsafe or hazardous operating conditions. For example, the IPS 15a and/or the IPS 15b may determine if the signature matches the information, substantially matches the information (e.g., a portion of the signature matches the information, the difference between the signature and the information is within an allowable threshold, etc.), etc. In some example implementations, to determine whether one or more of the references signature(s) matches the received information, the IPS 15a and/or the IPS 15b may generate a signature of the received information and compare the generated signature to one or more of the references signature(s). Alternatively, the IPS 15a and/or the IPS 15b may compare particular data portions of the received information to one or more of the references signature(s). Such data may include text, alphanumeric strings, binary strings, particular commands, etc. In other example implementations, other signature matching methods may alternatively be used.

If the IPS 15a and/or the IPS 15b determine that the information matches the signature(s), the IPS 15a and/or the IPS 15b prevent the information from reaching the safety instrumented system portion 14. If the IPS 15a and/or the IPS 15b determine that the information does not match the signature(s), the IPS 15a and/or the IPS 15b facilitate transmission of the information to the safety instrumented system. Additionally, the example IPS 15a and/or the IPS 15b receives information from the safety instrumented system portion 14 and facilitates transmission of the information to the process control portion 12 without monitoring.

The IPS 15a and/or the IPS 15b may be implemented using any type of network communications element that is capable of monitoring communications. For example, the IPS 15a and/or the IPS 15b may be a dedicated firewall, a network router having monitoring capabilities, a network switch having monitoring capabilities, a personal computer capable of interfacing with the process control portion 12 and the safety instrumented system portion 14 and capable of monitoring communications between the process control portion 12 and the safety instrumented system portion 14, etc. For example, the IPS 15a and/or the IPS 15b may be implemented using a personal computer, server computer, desktop computer, etc. executing the Snort® intrusion protection software available from Sourcefire®, Inc. While the example IPS 15a and/or the IPS 15b does not monitor information received from the safety instrumented system portion 14 to the operator stations or the process control portion 12, in other example implementations the IPS 15a and/or the IPS 15b may be configured to monitor such communications in addition to or as an alternative to monitoring communications in the opposite direction.

According to the illustrated example, the IPS 15a and/or the IPS 15b prevents unlock commands (e.g., unlock commands according to the Fieldbus Foundation system, unlock commands for a controller, etc.) from being communicated to the safety instrumented system portion 14 of the system 10. In other words, a user working on a component of the process control portion 12 (e.g., the operator station 18) cannot place any component of the safety instrumented system portion 14 into an unlocked state by sending an unlock command from the component of the process control portion 12 even though the unlock command is a legitimate message allowed by the process control portion 12.

To facilitate unlocking of components of the safety instrumented system portion 14, the switch 17a and the switch 17b of the illustrated example are configured to provide the capability of bypassing the IPS 15a and the IPS 15b, respectively. The switch 17a and the switch 17b enable communications that would be blocked by the IPS 15a or the IPS 15b from reaching their intended destination. The switch 17a and/or the switch 17b may be implemented as a device separate from the IPS 15a and/or the IPS 15b (as illustrated) or, alternatively, may be integrated with the IPS 15a and/or the IPS 15b. The switch 17a and/or the switch 17b may include a security mechanism (e.g., a key-lock, a keypad for entering a security code, etc.). Alternatively, the switch 17a and/or the switch 17b may include no integrated security. For example, if the switch 17a and/or the switch 17b are located in a facility that provides sufficient physical security to prevent unauthorized access to the switch 17a and/or the switch 17b, integrated security with the switch 17a and/or the switch 17b may not be necessary. Additionally, in some example implementations, the system 10 may not include the switch 17a and/or the switch 17b.

In addition to using the switch 17a and/or the switch 17b to bypass the IPS 15a and/or the IPS 15b, components of the safety instrumented system portion 14 may be unlocked by sending an unlock command from a component inside of the IPS 15a and/or the IPS 15b (e.g., from a component of the safety instrumented system portion 14. For example, an operator terminal that is directly connected to the safety instrumented system portion 14 (i.e., is not connected to the safety instrumented system portion 14 via the IPS 15) may send an unlock command to a component of the safety instrumented system portion 14. According to such an implementation, the unlock command may be issued by a device that is directly connected to the safety instrumented system portion 14 and, when the desired downloading is completed, a lock command may be issued by a component of the safety instrumented system portion 14 or a component of the process control portion 12. Alternatively, any other suitable method for unlocking components in a system including the IPS 15a and/or the IPS 15b may be used.

Figure 2:
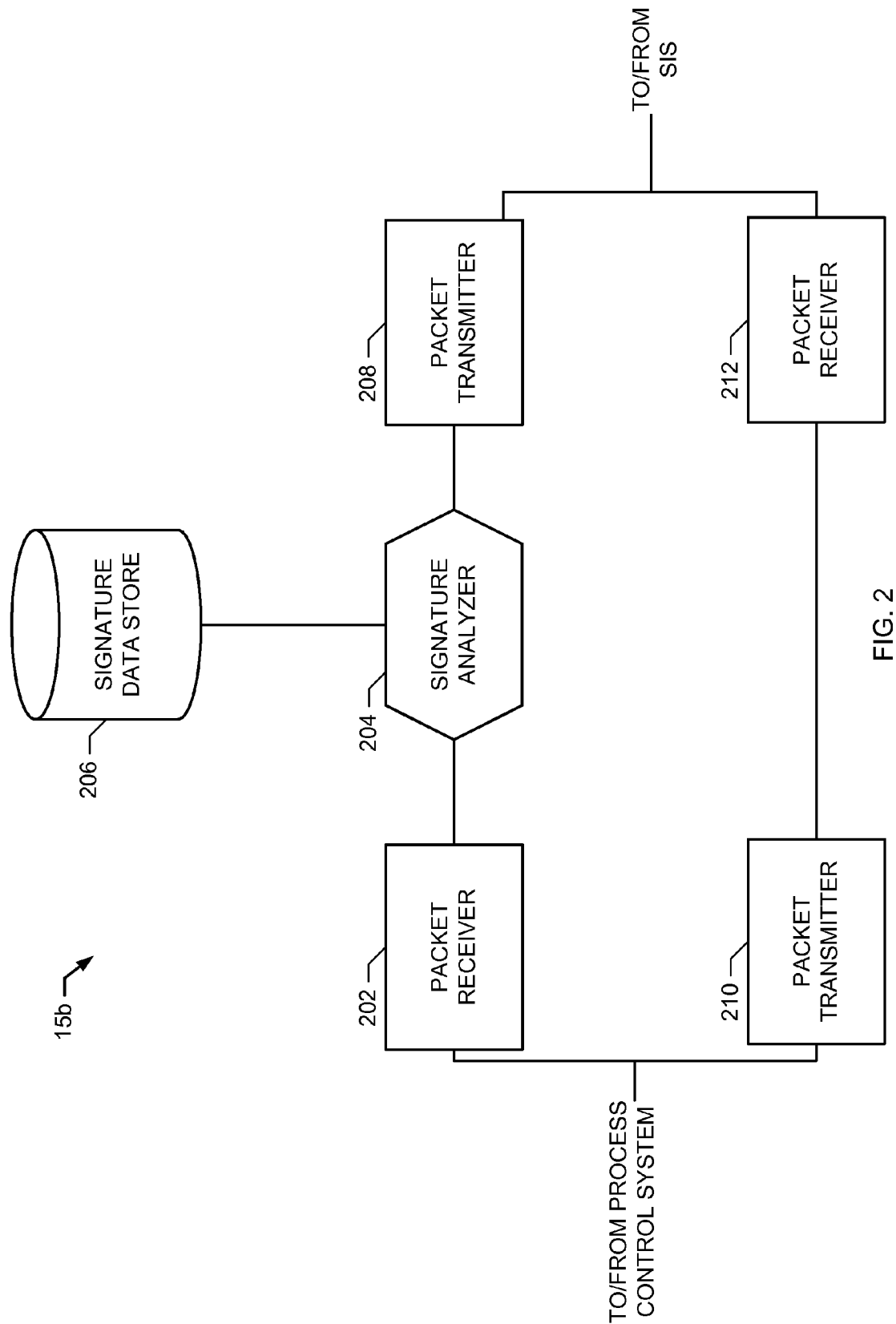
FIG. 2 is a detailed block diagram of the example intrusion protection system of FIG. 1.

FIG. 2 is a detailed block diagram of the example IPS 15a and/or the IPS 15b of FIG. 1. For ease of description, FIG. 2 is described with reference to the IPS 15b. The example IPS 15b of the illustrated example includes a first packet receiver 202, a signature analyzer 204, a signature data store 206, a first packet transmitter 208, a second packet transmitter 210, and a second packet receiver 212.

The first packet receiver 202 of the illustrated example receives information communicated from a process control portion of a process control system (e.g., the process control portion 12 of the system 10 of FIG. 1). The first packet receiver 202 transmits the received information to the signature analyzer 204. The first packet receiver 202 may be any type of communication interface such as, for example, a local area network interface, a wide area network interface, a wireless network interface, a service provider network interface, etc. The example first packet receiver 202 may be implemented as a separate device or may alternatively be implemented with a transmitter (e.g., the second packet transmitter 210) in a unitary device to form a packet transceiver.

The signature analyzer 204 of the illustrated example retrieves signatures from the signature data store 206 and compares the signatures to information received from the first packet receiver 202. If the signature analyzer 204 determines that the information matches one or more of the retrieved signatures, the signature analyzer 204 prevents the communications from being transmitted to the first packet transmitter 208 (i.e., prevents the information from being transmitted to a safety system). An example process for implementing the signature analyzer 204 will be described in conjunction with the flowchart of FIG. 3.

The example signature data store 206 stores signatures of information that is likely to be received from the process control portion 12 and analyzed by the signature analyzer 204. In the illustrated example, the signatures stored in the signature data store 206 describe (are indicative of) characteristics of legitimate information that would otherwise be allowed to transmit to the safety instrumented system portion 14 and can be interpreted by the safety instrumented system portion 14 to modify one or more operations thereof, but that the signature analyzer 204 has been configured to block, in the illustrated example, to prevent unsafe or hazardous operation. For example, a signature may indicate that a communications packet having a first value at a first offset in the packet header and a second value at a second offset in the packet header is an "unlock" instruction that should be prevented from reaching a safety system.

The first packet transmitter 208 receives information that is not dropped by the signature analyzer 204 and transmits the received information to a safety instrumented system portion of a process control system (e.g., the safety instrumented system portion 14 of FIG. 1). The first packet transmitter 208 may be any type of communication interface such as, for example, a local area network interface, a wide area network interface, a wireless network interface, a service provider network interface, etc. The example first packet transmitter 208 may be implemented as a separate device or may alternatively be incorporated with a receiver (e.g., the second packet receiver 212) in a unitary device to form a packet transceiver.

The second packet receiver 212 of the illustrated example receives information from the safety instrumented system portion 14 that is addressed to a process control portion of a process control system. According to the illustrated example, the second packet receiver 212 transmits the information to the second packet transmitter 210. Alternatively, the second packet receiver 212 may transmit received communications to a signature analyzer (e.g., the signature analyzer 204) to enable filtering of information from the safety instrumented system portion 14 that is addressed to the process control portion 12 of the control system 10. The second packet transmitter 210 receives information from the packet receiver 212 and transmits the packets to the process control portion 12 of the process control system 10. The second packet transmitter 210 and the second packet receiver 212 may be any type of communication interfaces such as, for example, a local area network interface, a wide area network interface, a wireless network interface, a service provider network interface, etc.

Figure 3:
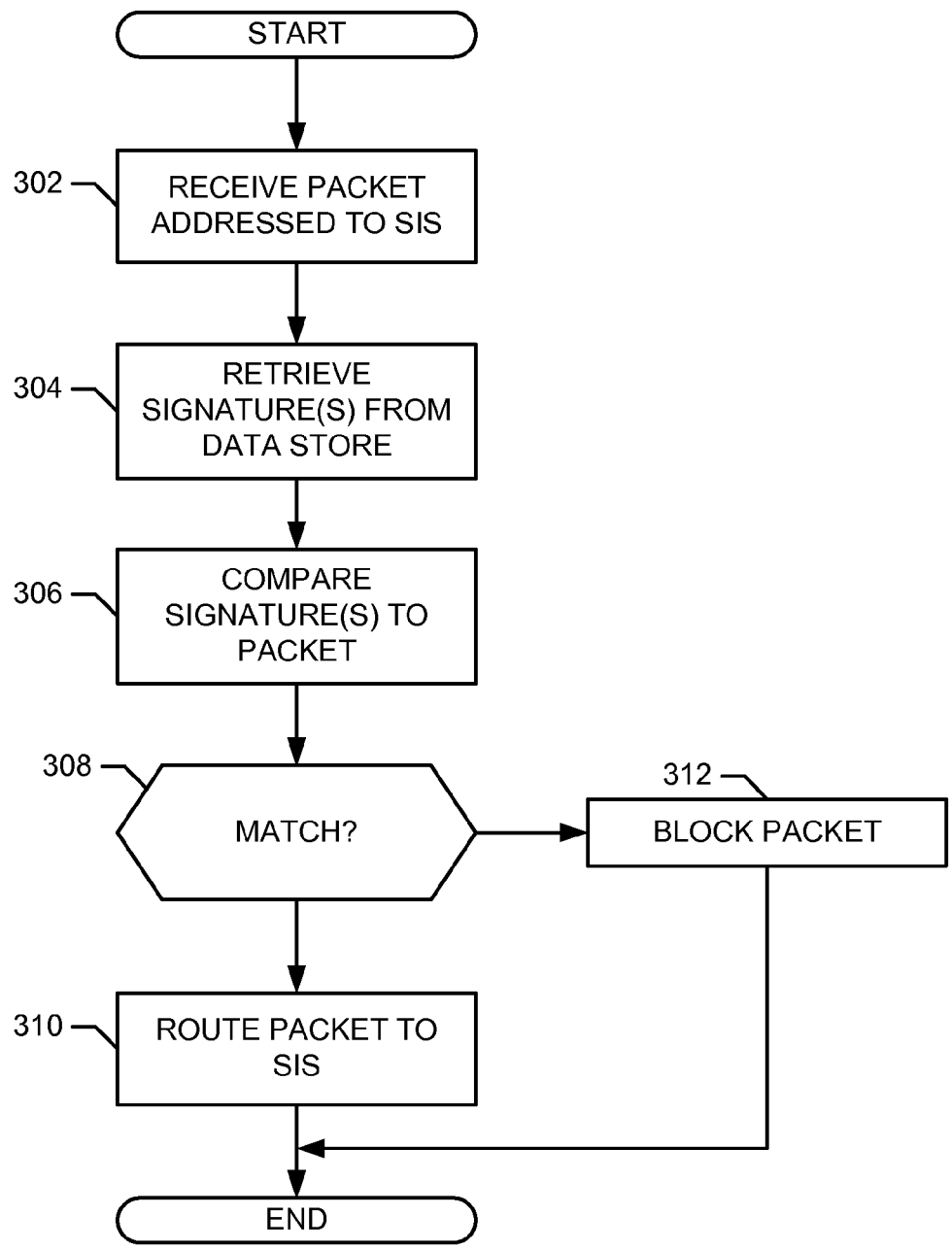
FIG. 3 is a flow diagram that depicts an example method that may be used to implement the example intrusion protection system of FIGS. 1 and 2.
Figure 4:
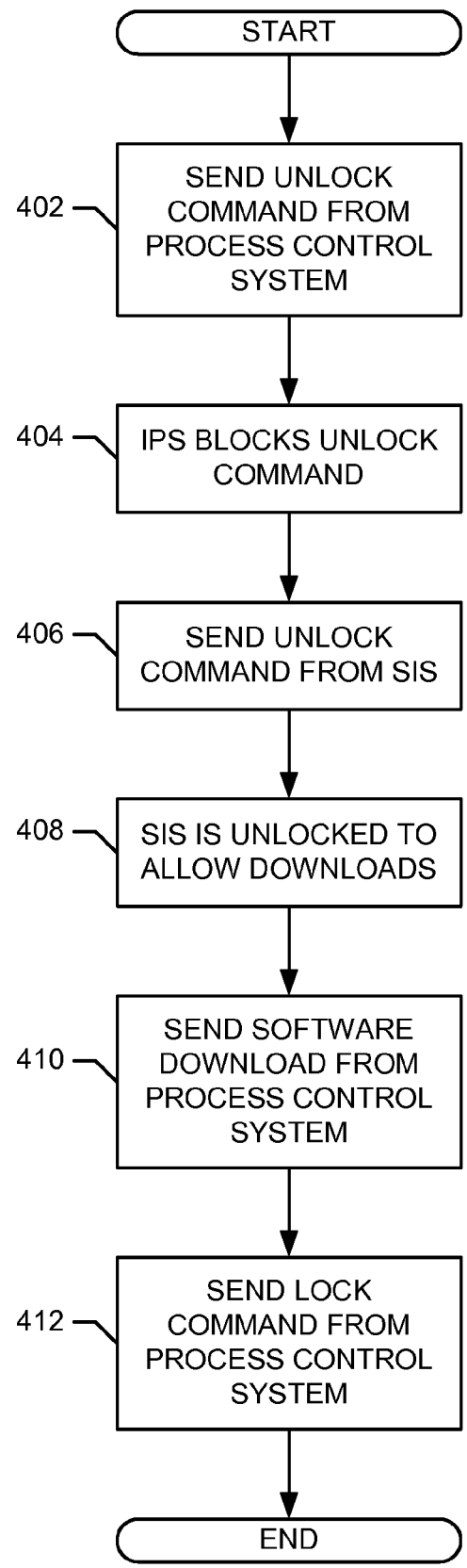
FIG. 4 is a flow diagram that depicts an example method that may be used in connection with the example intrusion protection system of FIGS. 1 and 2 to download software to the process control system.

FIG. 3 is a flowchart representative of an example process that may be used to implement the IPS 15a and/or the IPS 15b of FIGS. 1 and 2. FIG. 4 is a flowchart representative of an example process that may be implemented by the components of the system 10 of FIG. 1 such as, for example, the remote operator station 44, the active application station 20, the standby application station 22, the operator station 18, the IPS 15a, the IPS 15b, the logic solver 54, and/or the logic solver 52 of FIG. 1. The example processes of FIGS. 3 and/or 4 may be carried out by a processor, a controller and/or any other suitable processing device. For example, the example processes of FIGS. 3 and/or 4 may be embodied in coded instructions stored on a tangible machine accessible or readable medium such as a flash memory, a read-only memory (ROM) and/or random-access memory (RAM) associated with a processor (e.g., the example processor 505 discussed below in connection with FIG. 5). Alternatively, some or all of the example operations of FIGS. 3 and/or 4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIGS. 3 and/or 4 may be implemented manually or as any combination of any of the foregoing techniques, for example, any combination of firmware, software, discrete logic and/or hardware. Further, although the example processes of FIGS. 3 and/or 4 are described with reference to the flowcharts of FIGS. 3 and/or 4, other methods of implementing the example processes of FIGS. 3 and/or 4 may be employed. For example, the order of execution of the blocks may be changed, and/or some of the blocks described may be changed, eliminated, sub-divided, or combined. Additionally, any or all of the example operations of FIGS. 3 and/or 4 may be carried out sequentially and/or carried out in parallel by, for example, separate processing threads, processors, devices, discrete logic, circuits, etc.

For ease of description, FIG. 3 is described with reference to the IPS 15b, but the process of FIG. 3 may alternatively be used to implement the IPS 15a. The example process of FIG. 3 begins when a communications packet addressed to a safety instrumented system (e.g., the logic solver 54 of the safety instrumented system portion 14 of FIG. 1) is received at an intrusion protection system (e.g., IPS 15b of FIG. 1) (block 302). The safety instrumented system portion 14 then retrieves one or more signatures from an available data store (e.g., the data store 206 of FIG. 2) (block 304). The safety instrumented system then compares the received communications packet to the one or more retrieved signatures (block 306). For example, the signature analyzer 204 of FIG. 2 may compare a communications packet received from the first packet receiver 202 to one or more signatures retrieved from the signature data store 206. Any method of comparing the communications packet to the signature(s) may be used.

After comparing the received communications packet to the retrieved one or more signatures (block 306), the signature analyzer 204 determines if the received communications packet matches one or more of the retrieved signatures (block 308). If the received communications packet matches one or more of the retrieved signatures (block 308), the first packet transmitter 208 (FIG. 2) routes the communications packet is routed to the appropriate safety instrumented system (block 310). If the received communications packet does not match one or more of the retrieved signatures (block 308), the signature analyzer 204 blocks the communications packet (i.e., the communications packet is not routed to the safety instrumented system to which the communications packet was addressed) (block 312). The example process of FIG. 3 is then ended. In the illustrated example, the example process of FIG. 3 is performed each time a packet is received by the packet receiver 202.

The process of FIG. 4 is illustrative of an example process that may be used to safely download software to the process control system 10 of FIG. 1. The process of FIG. 4 is described with reference to the IPS 15b, however, the process may alternatively be used with the IPS 15a and communications associated therewith. The process of FIG. 4 begins when a component of a process control system (e.g., the operator station 18 of the system 10) sends an unlock command to a component of the safety instrumented system (e.g., the logic solver 52 of the safety instrumented system portion 14 of) (block 402). An intrusion protection system (e.g., the IPS 15b of FIGS. 1 and 2) receives the unlock command, determines that the unlock command is a legitimate instruction that should be blocked, and drops or blocks the unlock command (block 404). An example process for analyzing and blocking a communication is illustrated in FIG. 3.

According to the illustrated example process, at some later time, an unlock command is sent to the safety instrumented system portion 14 from a workstation (e.g., a workstation associated with the logic solver 52) in the safety instrumented system portion 14 (block 406). In other words, the command is sent via a communication link that is not connected to the safety instrumented system portion 14 via the IPS 15b. Thus, the unlock command is not blocked by the IPS 15b. Accordingly, the unlock command reaches the addressed safety instrumented system portion 14 and the safety instrumented system portion 14 is placed in an unlocked state (block 408). For example, the safety instrumented system may enter an unlocked state in which the safety instrumented system portion 14 is receptive to download requests sent to the safety instrumented system portion 14.

After the safety instrumented system portion 14 is in the unlocked state, a component in the process control system 10 sends a software download to the safety instrumented system portion 14 (block 410). For example, the operator station 18 may send a download request including updated parameters for the safety instrumented system portion 14. After the downloading process is completed, a component in the process control system 10 sends a lock command to return the safety instrumented system portion 14 to a locked state (block 412). Accordingly, the safety instrumented system portion 14 is returned to the locked state so that unauthorized devices may not send download requests to the safety instrumented system portion 14. The example process of FIG. 4 is then ended.

Figure 5:
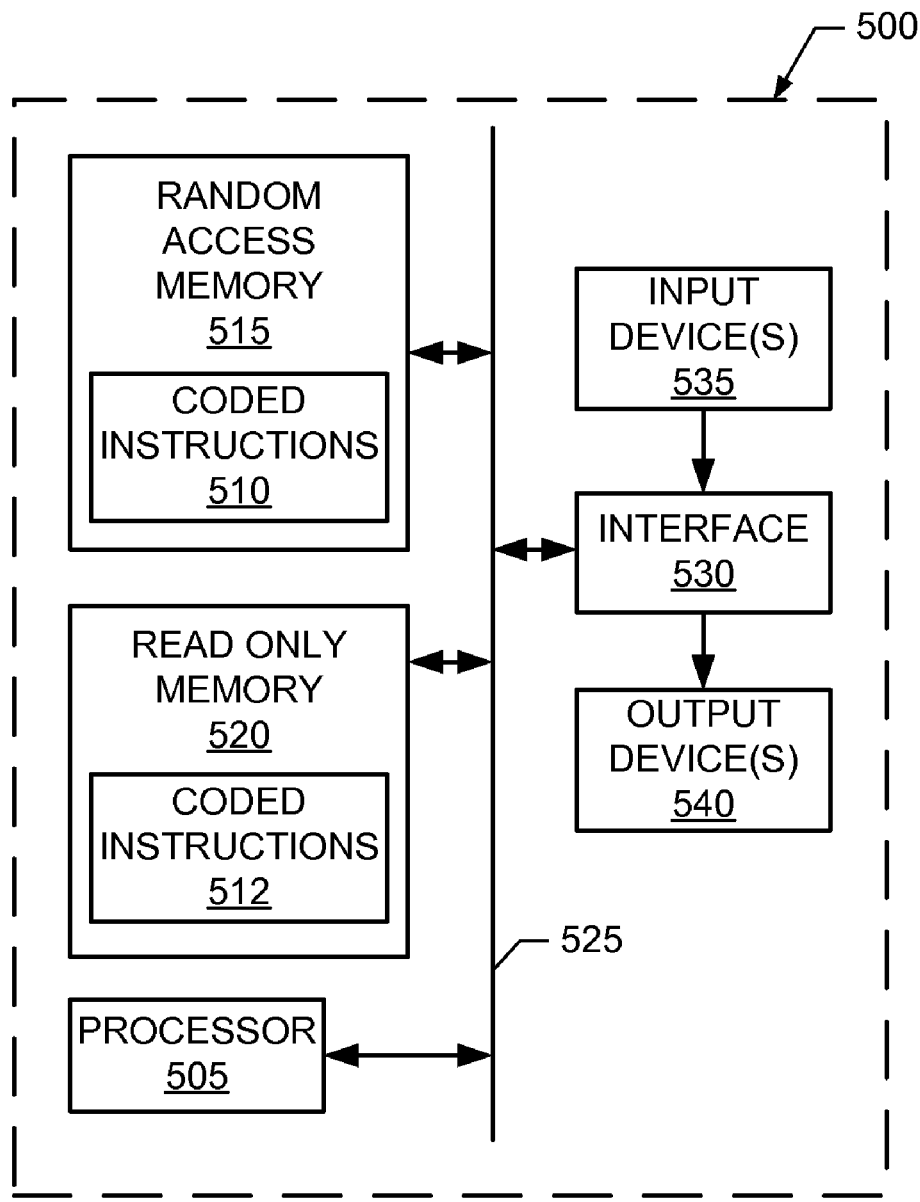
FIG. 5 is a block diagram of an example processor system that may be used to implement the apparatus and methods described herein.

FIG. 5 is a schematic diagram of an example processor platform 500 that may be used and/or programmed to implement any portion and/or component or all of the process control system 10 of FIG. 1 described herein. For example, the processor platform 500 can be implemented by one or more general purpose processors, processor cores, microcontrollers, etc.

The processor platform 500 of the example of FIG. 5 includes at least one general purpose programmable processor 505. The processor 505 executes coded instructions 510 and/or 512 present in main memory of the processor 505 (e.g., within a RAM 515 and/or a ROM 520). The processor 505 may be any type of processing unit, such as a processor core, a processor and/or a microcontroller. The processor 505 may execute, among other things, the example process of FIG. 3 and/or 4 to implement the example IPS 15a and/or the IPS 15b or any other device described herein. The processor 505 is in communication with the main memory (including a ROM 520 and/or the RAM 515) via a bus 525. The RAM 515 may be implemented by DRAM, SDRAM, and/or any other type of RAM device, and the ROM 520 may be implemented by flash memory and/or any other desired type of memory device. Access to the memory 515 and 520 may be controlled by a memory controller (not shown).

The processor platform 500 also includes an interface circuit 530. The interface circuit 530 may be implemented using any type of interface standard, such as a USB interface, a Bluetooth® interface, an external memory interface, serial port, general purpose input/output, etc. One or more input devices 535 and one or more output devices 540 are connected to the interface circuit 530.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

In addition, while the forgoing disclosure describes implementations for protecting a safety system (e.g., a safety instrumented system), the apparatus and methods described herein may be implemented to protect other types of important/critical systems. For example, the apparatus and methods may be used prevent changes to a turbine control system, a turbine protection system, a fire protection system, a gas detection system, etc.

What is claimed is:

1. A method of protecting a safety instrumented system, the method comprising:
    receiving a communication including an instruction to unlock the safety instrumented system, wherein the safety instrumented system is in a locked state, wherein the instruction to unlock the safety instrumented system causes the safety instrumented system to operate in a state in which the safety instrumented system is receptive to a software download;
    receiving the software download including updated parameters for the safety instrumented system, wherein the software download is intended for delivery and installation on the safety instrumented system;
    retrieving a signature from a data store configured to store a plurality of signatures, each of which is representative of a respective legitimate communication that is to be prevented from reaching the safety instrumented system;
    comparing the instruction and the software download to the signature;
    determining if the signature at least substantially matches the instruction and the software download;
    preventing the instruction from reaching the safety instrumented system when it is determined that the signature at least substantially matches the instruction;
    preventing the software download from being applied to the safety instrumented system while the safety instrumented system is in the locked state; and
    allowing the software download to reach the safety instrumented system when it is determined that the signature does not at least substantially match the software download or the instruction.

2. A method as defined in claim 1, wherein each of receiving, retrieving, comparing, determining, preventing, and allowing are performed by an intrusion protection system.

3. A method as defined in claim 2, further comprising manually bypassing the intrusion protection system.

4. A method as defined in claim 1, wherein the software download includes the instruction to unlock the safety instrumented system.

5. A method as defined in claim 1, wherein the software download is first legitimate information, the method further comprising:
receiving second legitimate information from the safety instrumented system;
causing the safety instrumented system to operate in an unlocked state;
receiving third legitimate information from a component of the process control system;
applying the third legitimate information to the safety instrumented system in response to determining that the safety instrumented system is in an unlocked state.

6. A method as defined in claim 5, wherein the component is a field device in a process control portion of the process control system and is separate from the safety instrumented system.

7. An apparatus to protect a safety instrumented system, the apparatus comprising:
a receiver to receive a communication including an instruction to unlock the safety instrumented system and to receive a software download including updated parameters for the safety instrumented system from an operator addressed to the safety instrumented system, wherein the safety instrumented system includes an instruction receiver to receive the communication including the instruction to unlock the safety instrumented system, wherein the safety instrumented system is in a locked state, and wherein the instruction to unlock the safety instrumented system causes the safety instrumented system to operate in a state in which the safety instrumented system is receptive to the software download;
a data store to store at least one signature, the at least one signature being representative of a respective legitimate communication that is prevented from reaching the safety instrumented system;
a signature analyzer to compare the at least one signature to the instruction and the software download, to determine if the at least one signature at least substantially matches the instruction and the software download, to prevent the instruction from reaching the safety instrumented system when it is determined that the signature at least substantially matches the instruction, and to prevent the software download from being applied to the safety instrumented system white the safety instrumented system is in a locked state; and
a transmitter to transmit the instruction to the safety instrumented system when the signature analyzer determines that the signature does not at least substantially match the instruction or the software download.

8. An apparatus as defined in claim 7, further comprising a manual bypass configured to allow communications to bypass the signature analyzer when the manual bypass is activated.

9. An apparatus as defined in claim 7, wherein the software download includes the instruction to unlock the safety instrumented system.

10. A non-transitory machine readable medium having instructions stored thereon that, when executed, cause a machine to at least:
receive a communication including an instruction to unlock the safety instrumented system, wherein the safety instrumented system is in a locked state, wherein the instruction to unlock the safety instrumented system causes the safety instrumented system to operate in a state in which the safety instrumented system is receptive to a software download;
receive the software download including updated parameters for the safety instrumented system from an operator station of a process control system addressed to the safety instrumented system;
retrieve a signature from a data store configured to store a plurality of signatures, each of which is representative of a respective legitimate communication that is to be prevented from reaching the safety instrumented system;
compare the instruction and the software download to the signature;
determine if the signature substantially matches the instruction and the software download;
prevent the instruction from reaching the safety instrumented system when it is determined that the signature at least substantially matches the instruction;
prevent the software download from being applied to the safety instrumented system while the safety instrumented system is in the locked state; and
allow the software download to reach the safety instrumented system when it is determined that the signature does not at least substantially match the software download or the instruction.

11. A non-transitory machine readable medium as defined in claim 10, wherein the instructions further cause the machine to use an intrusion protection system to receive, retrieve, compare, determine, prevent, and allow.

12. A non-transitory machine readable medium as defined in claim 11, wherein the instructions further cause the machine to manually bypass the intrusion protection system.

13. A non-transitory machine readable medium as defined in claim 10, wherein the software download includes the instruction to unlock the safety instrumented system.

14. A non-transitory machine readable medium as defined in claim 10, wherein the software download is first legitimate information, and wherein the instructions further cause the machine to:
receive second legitimate information from the safety instrumented system;
cause the safety instrumented system to operate in an unlocked state;
receive third legitimate information from the operator station of the process control system; and
apply the third legitimate information to the safety instrumented system in response to determining that the safety instrumented system is in an unlocked state.

* * * * *